United States Patent
Janssens et al.

(10) Patent No.: US 6,962,740 B2
(45) Date of Patent: *Nov. 8, 2005

(54) MULTILAYER, BIAXIALLY ORIENTED POLYESTER FILM, PROCESS FOR ITS PRODUCTION AND ITS USE

(75) Inventors: Bart Janssens, Wiesbaden (DE); Herbert Peiffer, Mainz (DE); Stefan Bartsch, Wiesbaden (DE)

(73) Assignee: Mitsubishi Polyester Film GmbH, Wiesbaden (DE)

( * ) Notice: Subject to any disclaimer, the term of this patent is extended or adjusted under 35 U.S.C. 154(b) by 32 days.

This patent is subject to a terminal disclaimer.

(21) Appl. No.: 10/683,935

(22) Filed: Oct. 10, 2003

(65) Prior Publication Data

US 2004/0076818 A1 Apr. 22, 2004

(30) Foreign Application Priority Data

Oct. 14, 2002 (DE) .......................... 102 47 894

(51) Int. Cl.$^7$ .......................... B32B 27/08; B32B 27/18; B32B 27/20; B32B 27/30; B32B 27/36

(52) U.S. Cl. ...................... 428/141; 428/323; 428/331; 428/426; 428/430; 428/446; 428/457; 428/458; 428/480; 428/910; 428/461; 428/463; 428/483; 264/288.4; 264/290.2

(58) Field of Search ................. 428/141, 323, 428/331, 426, 430, 446, 457, 458, 480, 910, 461, 463, 483; 264/288.4, 290.2

(56) References Cited

U.S. PATENT DOCUMENTS

| | | | |
|---|---|---|---|
| 4,214,035 A | | 7/1980 | Heberger |
| 4,571,363 A | * | 2/1986 | Culbertson et al. ......... 428/332 |
| 5,328,755 A | | 7/1994 | Mills et al. |
| 5,434,008 A | * | 7/1995 | Felts .......................... 428/461 |
| 5,508,075 A | * | 4/1996 | Roulin et al. ............... 428/35.7 |
| 5,824,394 A | * | 10/1998 | Kinoshita et al. ......... 428/195.1 |
| 6,194,054 B1 | * | 2/2001 | Peiffer et al. ............... 428/141 |
| 6,214,440 B1 | * | 4/2001 | Peiffer et al. ............... 428/141 |
| 6,261,663 B1 | * | 7/2001 | Peiffer et al. ............... 428/141 |
| 6,291,053 B1 | * | 9/2001 | Peiffer et al. ............... 428/141 |
| 6,376,042 B1 | * | 4/2002 | Peiffer et al. ............... 428/141 |
| 6,423,401 B2 | * | 7/2002 | Peiffer et al. ............... 428/216 |
| 6,528,144 B2 | * | 3/2003 | Peiffer et al. ............... 428/141 |
| 6,537,647 B2 | * | 3/2003 | Peiffer et al. ............... 428/141 |
| 6,554,686 B1 | * | 4/2003 | Kaeser et al. ................. 451/36 |
| 2001/0035593 A1 | * | 11/2001 | Peiffer et al. ............ 264/176.1 |
| 2001/0038894 A1 | * | 11/2001 | Komada .................... 428/34.6 |
| 2004/0076818 A1 | * | 4/2004 | Janssens et al. ............ 428/323 |
| 2004/0076821 A1 | * | 4/2004 | Janssens et al. ............ 428/327 |

FOREIGN PATENT DOCUMENTS

| | | | |
|---|---|---|---|
| DE | 1 694 404 A | 4/1971 | .......... B32B/27/00 |
| DE | 22 30 970 | 2/1973 | .............. C08J/1/36 |
| EP | 0 088 635 A2 | 9/1983 | .......... H01F/10/26 |
| EP | 0 322 529 | 1/1985 | .......... B32B/15/08 |
| EP | 0 144 948 A2 | 6/1985 | .............. C08J/7/04 |
| EP | 0 514 129 A2 | 11/1992 | .......... B32B/27/20 |
| EP | 0 602 964 A1 | 6/1994 | .......... G11B/5/704 |
| EP | 0 604 057 A1 | 6/1994 | .......... B32B/27/36 |
| EP | 0 903 221 A2 | 3/1999 | .......... B32B/27/36 |
| EP | 0 903 222 A2 | 3/1999 | .......... B32B/27/36 |
| EP | 0 952 176 A1 | 10/1999 | .............. C08J/5/18 |

* cited by examiner

Primary Examiner—Vivian Chen
(74) Attorney, Agent, or Firm—ProPat, L.L.C.

(57) ABSTRACT

Three-layer, highly oriented polyester films having an A-B-C layer construction, preferably made of polyethylene terephthalate, which, in addition to a base layer B have a smooth surface layer A which contains no external particles and a rough surface layer C which contains external particles such as antiblocking agents or pigments, preferably $SiO_2$, in defined amounts and particle sizes, and the surface layer C is additionally provided with an acrylate-containing layer D feature in particular good producibility and processibility, high gloss of the film surface A and low opacity. The very smooth surface A is suitable in particular for coating with materials, for example $SiO_x$, by means of plasma polymerization of hexamethyldisiloxane by the CVD or PECVD method, which provides the film with a high oxygen barrier and is suitable in particular as packaging for light- and air-sensitive foods or other consumable items.

18 Claims, No Drawings

MULTILAYER, BIAXIALLY ORIENTED POLYESTER FILM, PROCESS FOR ITS PRODUCTION AND ITS USE

BACKGROUND OF THE INVENTION

The invention relates to a transparent, preferably three-layer, biaxially oriented polyester film having a smooth surface A which has substantially no external particles, and a rough surface C which contains antiblocking particles in a certain size. In addition, the film has at least one acrylate-containing layer D which is applied to the surface C as an aqueous dispersion. To attain a very high surface smoothness of the surface A, the film is highly oriented. The film is suitable in particular for barrier coatings which are applied by the CVD (chemical vapor deposition) or by the PECVD (plasma enhanced chemical vapor deposition) method. The invention further relates to a process for producing the film and to its use.

Films having a smooth surface A are disclosed by the prior art.

For instance, films in accordance with examples 4 and 6 of EP-A-0 903 222 contain no external pigments in the surface layer A. The film accordingly has a smooth surface A. According to experiments carried out there, the film has good barrier values, in particular after metallization or coating with ceramic materials. For barrier coating by the CVD or the PECVD method, the smoothness of the surface A to be coated is in need of improvement. Also in need of improvement is the processing performance of the film, in particular on high-speed machines. The film according to the aforementioned examples 4 and 6 is not adequately pigmented on the surface layer C on the opposite side to the surface layer A. In the case of coating in high-vacuum units, for example in units which work by the CVD or by the PECVD method, the unit is evacuated before the coating. This also allows air present in the film roll to escape, resulting in the individual film plies lying in close contact. Inadequate pigmentation may result in poor running performance of the film in the machine (pulling on the bias, blocking). The winding quality of the coated film is unsuitable for the further processing of the film (lamination, printing). Such a film also has a very strong tendency to electrostatic charging.

DE-A-16 94 404 describes a film composed of layers of an oriented crystallizable thermoplastic film, in which at least one of the outer layers contains an additive. The additives are customary inert inorganic or organic particles which, in the case of inert particles such as $SiO_2$ are added to the outer layers in a concentration of from 1 to 25% by weight. The particle size is from 2 to 20 $\mu$m. These laminates can be used, for example, for decorative purposes metalized with aluminum or for magnetic tapes. There is no information whatsoever in the document as to how the topography of such a film can be adjusted for the improvement of the oxygen barrier.

DE-A-22 30 970 describes a magnetic recording medium which consists of a biaxially oriented polyester film and a thin magnetic metallic layer on the surface A of the polyester film. The film has
a) a coated surface A which is free of particles and
  i) is at least 4 $\mu$m thick or
  ii) is at least 50% of the thickness of the overall film ply; and
b) a particle-containing second layer having a comparatively rough surface which contains
  i) at least 1% of individual particles of a certain polymer A and
  ii) at least 1% of individual particles of a certain polymer B.

There is again no information whatsoever in the document as to how the topography of such a film for the improvement of an oxygen barrier can be attained.

EP-B-0 088 635 describes a coextruded, biaxially oriented polyester film having at least two layers of which one layer A consists of thermoplastic resin and one layer B which comprises thermoplastic resin and fine particles. The film has a surface roughness $R_a$ of the outer surface of layer A of less than 5 nm and the outer surface of layer B has either a surface having a surface roughness $R_a$ of from 5 to 40 nm and a plurality of depressions and a plurality of protrusions which are arranged in a certain arrangement, or a surface having protrusions formed on a flat plane and whose surface is covered with a layer C composed of a lubricant and having a surface roughness $R_a$ of from 5 to 40 nm.

EP-A-0 514 129 describes a transparent multilayer film which comprises a primary layer substrate of polymer material which, on at least one of its surfaces, has a secondary layer of polymer material which has glass beads and silicon dioxide particles in certain concentrations and in certain size distributions. The secondary layer may be disposed on one or on both sides of the primary layer substrate. The film improves the opacity and the processing properties, but the document does not provide any teaching on the improvement of the gloss and of the barrier properties of the film. There is also no information whatsoever in the document as to how the topography of such a film for the simultaneous improvements of gloss and oxygen barrier is to be attained.

EP-A-0 604 057 describes a transparent multilayer film which comprises a primary layer substrate of polymer material which is substantially free of fillers and, on at least one of its surfaces, has a secondary layer of polymer material which contains silicone resin as a filler in a concentration of from 100 to 1000 ppm and an average particle diameter of from 1.5 to 12.5 $\mu$m. A disadvantage of the silicone particles is that they are comparatively expensive and do not constitute an acceptable solution for the packaging market. In addition, films which are equipped with such pigments have a more marked tendency to telescope on winding. There is likewise no information whatsoever in this document as to how the topography of such a film for the simultaneous improvement of gloss and oxygen barrier is to be attained.

As a consequence of the lacking smoothness of the surface A to be coated, the films described in the prior art are unsuitable for barrier coating by the CVD or by the PECVD method, or are at least in need of improvement. Likewise in need of improvement is the processing performance of these films on these high-vacuum units.

BRIEF DESCRIPTION OF THE INVENTION

It is an object of the present invention to provide a transparent, biaxially oriented polyester film which is suitable in particular for barrier coating by the CVD or by the PECVD method. After barrier coating with substances which are used in the CVD or by the PECVD method (for example plasma polymerization of hexamethyldisiloxane, $CH_4$) the film should have the desired high oxygen barrier. In addition, the required good winding quality of the film should not be impaired by the coating procedure; it would be desirable for the film to only insignificantly charge electrostatically during the coating procedure and in all subsequent processing steps. Moreover, the film should feature good producibility and processability. In summary, the object was to provide a film having the following combination of features:

high oxygen barrier (meaning low oxygen permeation) of the film after barrier coating of the film surface A by the CVD or by the PECVD method (utilization of plasma polymerization)

good preparability, in particular good windability and good roll formation, and also good processibility high gloss of the film surface A to be coated (high surface smoothness)

high transparency, i.e. low opacity.

The film should be at least equivalent in the remaining properties to the existing packaging films of this type. It should be possible, for example, to produce them simply and inexpensively, and to process them efficiently on the conventional machines.

DETAILED DESCRIPTION OF THE INVENTION

This object is achieved by a biaxially oriented polyester film which has a base layer B composed of at least 80% by weight of a thermoplastic polyester, and has two outer layers A and C, wherein a) the outer layer A has high surface smoothness and comprises substantially no external particles, b) the outer layer C comprises external particles and has, per $mm^2$ of film surface area, a number of elevations $N_c$ which correlate by way of the following equation to their respective heights h $$A_{h1} - B_{h1} \cdot \log_{10}h/\mu m \leq \log_{10}(N_c/mm^2) \quad (1)$$

$$0.01 \ \mu m \leq h \leq 1 \ \mu m$$

$$A_{h1} = 0.05; \ B_{h1} = 3.3$$

and c) the outer layer C has an acrylate-containing layer D.

The inventive film is preferably transparent and has an A-B-C-D layer structure. It is produced by coextrusion.

The layer A preferably contains no external particles and the film preferably has a planar orientation Δp of greater than 0.163.

In the context of the present invention, elevations are conical elevations which protrude from the planar, oriented film surface.

By using the crosslinked, acrylate-containing coating D on at least the surface layer C, both the roll formation and the processibility of the film can be distinctly improved, without worsening the outstanding optical properties of the film. It has also been found that the outstanding optical properties of the film are not diminished when the regrind which occurs (and may contain portions of the acrylic coating) in the course of film production is reused in the form of its own regrind for the base layer B of the film.

According to the invention, the film is three- or four-layered. Its layers include a base layer B, a substantially pigment-free, high-gloss surface layer A and, on the other side of the base layer B, a further layer C, preferably composed of polyethylene terephthalate. The layer C comprises the pigments required for the production and processing of the film.

It is possible in principle to use different raw materials for the different layers. However, preference is given to producing the individual layers on the basis of polyester raw materials.

The base layer B of the film consists of at least 80% by weight of a thermoplastic polyester. Suitable for this purpose are polyesters of ethylene glycol and terephthalic acid (polyethylene terephthalate, PET), of ethylene glycol and naphthalene-2,6-dicarboxylic acid (polyethylene 2,6-naphthalate, PEN), of 1,4-bishydroxymethylcyclohexane and terephthalic acid (=poly-1,4-cyclohexanedimethylene terephthalate, PCDT) and also of ethylene glycol, naphthalene-2,6-dicarboxylic acid and biphenyl-4,4'-dicarboxylic acid (=polyethylene 2,6-naphthalate bibenzoate, PENBB). Particular preference is given to polyesters which consist of at least 90 mol %, preferably at least 95 mol %, of ethylene glycol and terephthalic acid units or of ethylene glycol and naphthalene-2,6-dicarboxylic acid units. The remaining monomer units stem from other aliphatic, cycloaliphatic or aromatic diols, or other dicarboxylic acids, as may also occur in layers A or C.

The base layer preferably consists of PET.

Suitable other aliphatic diols are, for example, diethylene glycol, triethylene glycol, aliphatic glycols of the general formula HO—$(CH_2)_n$—OH where n is an integer from 3 to 6 (in particular propane-1,3-diol, butane-1,4-diol, pentane-1,5-diol and hexane-1,6-diol) or branched aliphatic glycols having up to 6 carbon atoms. Of the cycloaliphatic diols, mention should be made of cyclohexanediols (in particular cyclohexane-1,4-diol). Suitable other aromatic diols correspond, for example, to the formula HO—$C_6H_4$—X—$C_6H_4$—OH, where X is —$CH_2$—, —$C(CH_3)_2$—, —$C(CF_3)_2$—, —O—, —S— or —$SO_2$—. Also suitable in addition are bisphenols of the formula HO—$C_6H_4$—$C_6H_4$—OH.

Other aromatic dicarboxylic acids are preferably benzene-dicarboxylic acids, naphthalenedicarboxylic acids (for example naphthalene-1,4- or -1,6-dicarboxylic acid), biphenyl-x,x'-dicarboxylic acids (in particular biphenyl-4,4'-dicarboxylic acid), diphenylacetylene-x,x'-dicarboxylic acids (in particular diphenylacetylene-4,4'-dicarboxylic acid) or stilbene-x,x'-dicarboxylic acids. Of the cycloaliphatic dicarboxylic acids, mention should be made of cyclohexanedicarboxylic acids (in particular cyclohexane-1,4-dicarboxylic acid). Of the aliphatic dicarboxylic acids, the ($C_3$–$C_{19}$)-alkanedioic acids are particularly suitable, and the alkane moiety may be straight-chain or branched.

The polyesters may be prepared by the known transesterification processes (see Polyesters, V. V. Korshak and S. V. Vinogradova, Pergamon Press, 1965, and Encyclopedia of Chemical Technology, Fourth Edition, Vol. 19, Pigments to Powders, Handling, Wiley & Sons). In this process, the starting materials are dicarboxylic esters and diols which are reacted with the customary transesterification catalysts such as salts of zinc, calcium, lithium, magnesium and manganese. The intermediates are then polycondensed in the presence of generally customary polycondensation catalysts such as antimony trioxide or titanium salts. The preparation may equally be by the direct esterification process in the presence of polycondensation catalysts. This starts directly from the dicarboxylic acids and the diols.

Particularly suitable processes have been found to be those in which transesterification catalysts are used which only slightly disrupt the smoothness of the surface A of the film. Preference is given in particular to magnesium and manganese salts. These transesterification catalysts are preferably used in the preparation of the basis raw material, but more preferably in the preparation of the raw material for the layer A.

Films having the required smooth surface A are obtained in particular when raw materials/polymers are used which have been prepared, for example, using Mn, Mg or Ca transesterification catalysts and in which the Mn content is in the range from 50 to 200 ppm or the Mg content is in the range from 100 to 300 ppm or the Ca content is in the range from 50 to 300 ppm. This generates internal particles which leads to films having the inventive surface ($R_a \leq 28$ nm, preferably $\leq 25$ nm, more preferably $\leq 21$ nm). However, it is also possible in principle to use other transesterification catalysts.

It is possible in principle to use the same polymers for layer A as for the base layer B. Other materials may also additionally be present in the layer A, in which case the layer A then preferably consists of a mixture of polymers, a copolymer or a homopolymer which preferably contain ethylene 2,6-naphthalate units and/or ethylene terephthalate units. Up to 10 mol % of the polymers may consist of further comonomers, as have been described for the base layer B.

It is possible in principle to use the same polymers for the other layer (outer layer C) as have been described previously for the base layer B or the layer A.

For the processing of the polymers, it has been found to be advantageous to select the polymers for the base layer and the two other layers in such a way that the viscosities of the particular polymer melts do not differ too greatly. Otherwise, additional unevenness, disruption to flow or streak formation on the finished film are to be expected in some circumstances. To describe the viscosity ranges of the melts for the particular layers, the intrinsic viscosity IV is used. For commercial polyethylene terephthalates which are suitable with preference for producing the biaxially oriented films, the IV values are in the range from 0.54 to 0.76. In order to ensure impeccable quality of the film for the purposes of the present invention, the SV value of the polymers for the layers A or C should be in the range from approximately 0.55 to 0.75, preferably in the range from 0.56 to 0.74, especially preferably in the range from 0.57 to 0.73. If necessary, a solid phase condensation can be carried out on the individual granules, in order to attain the required IV values of the materials. The IV values of the polymer melts for the base layer and the two outer layers should differ preferably by not more than 0.1, more preferably by not more than 0.08, but in particular by not more than 0.06, IV unit.

The base layer B and the two other layers may additionally contain customary additives, for example stabilizers. They are advantageously added to the polymer or to the polymer mixture before they are melted. The stabilizers used are, for example, phosphorus compounds such as phosphoric acid or phosphoric esters.

The surface layer A of the film of the present invention preferably contains no antiblocking agents or other external particles. The surface layer C of the film of the present invention contains antiblocking agents in a certain concentration and in a certain size. The base layer contains substantially only antiblocking agents which are introduced into the base layer via regeneration of the film, i.e. when film offcut (regrind) is used, for example, to produce the film. Typical antiblocking agents (also referred to in this context as pigments) are inorganic and/or organic particles, for example calcium carbonate, amorphous silica, talc, magnesium carbonate, barium carbonate, calcium sulfate, barium sulfate, lithium phosphate, calcium phosphate, magnesium phosphate, aluminum oxide, LiF, calcium, barium, zinc or manganese salts of the dicarboxylic acids used, carbon black, titanium dioxide, kaolin or crosslinked polystyrene or acrylate particles.

It is also possible to select mixtures of two and more different antiblocking agents or mixtures of antiblocking agents of the same composition, but different particle size. The particles can be added to the individual layers in the concentrations which are advantageous in each case, for example as a glycolic dispersion, during the polycondensation or via masterbatches in the course of extrusion. A detailed description of the antiblocking agents which can be used can be found, for example, in EP-A-0 602 964.

Preferred particles for the outer layer C are $SiO_2$ in colloidal and in chainlike form. The particle diameters of the particles used are in principle not restricted. For the achievement of the object, it has been found to be advantageous to use particles having an average primary particle diameter of less than 60 nm, preferably less than 55 nm and more preferably less than 50 nm and/or particles having an average primary particle diameter (the $d_{50}$ value) in the range from 1 to 4 µm, preferably in the range from 1.5 to 3.5 µm and more preferably in the range from 2.5 to 3.0 µm.

It has also been found to be particularly advantageous when the distribution of the particle diameter lies within certain limits. To achieve very low opacity and very high gloss, the outer layer C comprises a pigment system for which the variance in diameter d (expressed by the SPAN 98) is preferably less than 1.9.

The pigment concentration in the outer layer C is preferably between 0.1 and 0.5% by weight, advantageously between 0.15 and 0.45% by weight, in particular between 0.2 and 0.4% by weight and most preferably between 0.25 and 0.35% by weight, based on the weight of layer C. It depends in particular on the desired processing performance of the film. Preference is given to selecting the pigment type(s), the pigment concentration(s) and the particle concentration(s), and also the layer thickness ratios, in such a way that the film has good optical properties and also good producibility and processibility. These parameters can be determined simply and reliably by a few preliminary experiments.

The pigments for the surface layer C are to be selected with respect to size, concentration and their distribution in such a way that the number of elevations $N_c/mm^2$ can be described by the following equations (h=height of the elevations):

$$A_{h1} - B_{h1} \cdot \log_{10} h/\mu m \leq \log_{10}(N_c/mm^2) \quad (1)$$

$$0.01 \ \mu m \leq h \leq 1 \ \mu m$$

Constants $A_{h1}$, $B_{h1}$

|  | $A_{h1}$ | $B_{h1}$ |
| --- | --- | --- |
| inventive | 0.05 | 3.3 |
| preferred | 0.624 | 3.229 |
| more preferred | 1.1 | 3 |
| most preferred | 2.477 | 2.22 |

In an advantageous embodiment of the invention, the number of elevations $N_c/mm^2$ can be described by the following equation (2):

$$A_{h1} - B_{h1} \cdot \log_{10} h/\mu m \leq \log_{10}(N_c/mm^2) \leq A_{h2} - B_{h2} \cdot \log_{10} h/\mu m \quad (2)$$

$$0.01 \, \mu m \leq h \leq 1 \, \mu m$$

Constants $A_{h1}$, $B_{h1}$, $A_{h2}$, $B_{h2}$

|  | $A_{h1}$ | $B_{h1}$ | $A_{h2}$ | $B_{h2}$ |
|---|---|---|---|---|
| inventive | 0.05 | 3.3 | 4.08 | 1.5 |
| preferred | 0.624 | 3.229 | 4.08 | 1.5 |
| more preferred | 1.1 | 3 | 4.08 | 1.5 |
| most preferred | 2.477 | 2.22 | 4.08 | 1.5 |

When the outer layer C of the film of the present invention has a topography in which the number of elevations is below the range indicated by the equation (1), the film is difficult to produce and the processing performance is often inadequate. The film tends to block.

In the film of the present invention, the thicknesses of the outer layers A and C are generally greater than 0.6 $\mu$m and are preferably in the range from 0.6 to 2.5 $\mu$m, advantageously in the range from 0.7 to 2.3 $\mu$m, in particular in the range from 0.8 to 2.2 $\mu$m and most preferably in the range from 0.9 to 2.1 $\mu$m. The outer layers A and C may have the same or different thickness.

The total thickness of the polyester film according to the invention may vary within wide limits and depends on the intended application. It is preferably from 4 to 50 $\mu$m, in particular from 5 to 45 $\mu$m, with preference from 6 to 40 $\mu$m, and the layer B has a proportion of preferably from 5 to 95% of the total thickness.

According to the invention, at least one side of the film, preferably the rough surface C, has been coated with a preferably aqueous dispersion. The coating D on the finished film has a thickness of from approx. 5 to 2000 nm, preferably from 10 to 500 nm, in particular from 20 to 200 nm. The coating is preferably applied inline, i.e. during the film production process, appropriately before the transverse stretching. Particular preference is given to applying the coating by means of the reverse gravure-roll coating method in which the coatings can be applied very homogeneously in layer thicknesses of up to 100 nm. Preference is likewise given to applying the coating by the Meyer rod method (literature on the coating methods: Die Kunststoffe, Kunststoffhandbuch, Dr. Bodo Carlowitz, Hanser, 1990), by which relatively large coating thicknesses can be achieved. The coating is applied preferably as a solution, suspension or dispersion, more preferably as an aqueous solution, suspension or dispersion. The coating mentioned confers on the film surface or on the film the desired functions (low coefficient of friction, good processibility, good roll formation, low static charge) and possible further functions. For example, the printability of the film can be improved or it can be provided with an improved aroma barrier or adhesion can be made possible to materials which would not otherwise adhere to the uncoated film surface (for example photographic emulsions).

The materials/compositions mentioned are applied to one or both film surfaces as a dilute solution, emulsion or dispersion, preferably as an aqueous solution, emulsion or dispersion, and the solvent/the dispersant is subsequently volatilized. When the coating is applied in line before the transverse stretching, the heat treatment in the transverse stretching and subsequent heat setting is commonly sufficient to volatilize the solvent/the dispersant and dry the coating.

The dispersion comprises acrylic copolymers as a solid constituent. The copolymers used with preference consist preferably substantially of at least 50% by weight of one or more polymerized acrylic and/or methacrylic monomers and of from approx. 1 to 15% by weight of copolymerizable comonomers which, in the copolymerized state, are capable of developing intermolecular crosslinking under the action of elevated temperature, in some cases without addition of a special resinous crosslinking agent. The acrylic copolymers may in principle also contain further monomer units.

The acrylic component of the copolymers is present preferably in an amount of from 50 to 99% by weight and preferably consists of an ester of methacrylic acid, in particular an alkyl ester, whose alkyl group contains up to 10 carbon atoms, for example the methyl, ethyl, n-propyl, isopropyl, n-butyl, isobutyl, tertiary butyl, hexyl, 2-ethylhexyl, heptyl and n-octyl group. Acrylic copolymers which are derived from a lower alkyl acrylate ($C_1$ to $C_4$), in particular ethyl acrylate, together with a lower alkyl methacrylate, provide particularly good adhesion between the polyester film and reprographic coatings and matt coatings applied thereto. Very particular preference is given to using adhesion promoter copolymers of an alkyl acrylate, e.g. ethyl acrylate or butyl acrylate, together with an alkyl methacrylate, e.g. methyl methacrylate, in particular in the same molar proportions and in a total amount of from approx. 70 to 95% by weight. The acrylate comonomer of such acrylic/methacrylic combinations is present preferably in a proportion of from 15 to 65 mol % and the methacrylate comonomer preferably in a proportion which is generally from 5 to 20 mol % greater than the proportion of the acrylate comonomers. The methacrylate is preferably present in the combination in a proportion of from 35 to 85 mol %.

Comonomers which are suitable in accordance with the invention and are also used for increasing the solvent resistance and intermolecular crosslinking of the coating are, for example, N-methylolacrylamide, N-methylolmethacrylamide and the corresponding ethers; epoxide materials, e.g. glycidyl acrylate, glycidyl methacrylate and allyl glycidyl ether; monomers containing carboxyl groups, e.g. crotonic acid, itaconic acid or acrylic acid; anhydrides, e.g. maleic anhydride; monomers containing hydroxyl groups, e.g. itaconic anhydride; monomers containing hydroxyl groups, e.g. allyl alcohol and hydroxyethyl or hydroxypropyl acrylate or methacrylate; amides, e.g. acrylamide, methacrylamide or maleamide and isocyanates, e.g. vinyl isocyanate or allyl isocyanate. Of the abovementioned crosslinking comonomers, preference is given to N-methylolacrylamide and N-methylolmethacrylamide, primarily because copolymer chains which contain one of these monomers are able under the action of elevated temperatures to condense together and thus to develop the desired intermolecular crosslinking. However, the solvent resistance which is desired in some cases of the preferred acrylate coating can also be achieved by the presence of an extraneous crosslinking agent, for example a melamine- or urea-formaldehyde condensation product. When no solvent resistance is required, crosslinking agents can be dispensed with.

The above-described inventive coating is illustrated in detail in U.S. Pat. No. 4,571,363, United States equivalent of EP-A-0 144 948, which is explicitly incorporated herein at this point (cf. in particular page 5 to page 17). This document also gives information about further specific combinations of such mixed acrylic copolymers, which are not reproduced here but are explicitly encompassed by the invention.

This coating is applied in accordance with the object set preferably to the surface of the outer layer C (the side which is not coated with barrier substances) of the film. However, it is also possible to also provide the other side (the outer layer A) with the inventive coating or to apply another coating to this side. The coating formulation may contain known additives, for example antistats, wetting agents, surfactants, pH regulators, antioxidants, dyes, pigments, antiblocking agents, for example colloidal $SiO_2$, etc. It is normally appropriate to incorporate a surfactant, in order to increase the ability of the aqueous coating to wet the polyester carrier film.

In the film of the present invention, the coefficient of friction (COF) of the film side C which bears the acrylic coating is particularly low. On this (coated side), the coefficient of friction is generally less than 0.45, preferably less than 0.42 and more preferably less than 0.4. The low coefficient of friction makes an important contribution to good processing performance of the film and to good roll formation.

A particular advantage is that the production costs of the film according to the invention are only slightly above those of a film made of standard polyester raw materials. The properties of the film according to the invention which are relevant to processing and use are distinctly improved compared to prior art films.

In addition, when producing the film, it is guaranteed that the regrind can be reused in a proportion of up to approx. 60% by weight, preferably from 10 to 50% by weight, based in each case on the total weight of the film, without significantly adversely affecting the physical properties of the film.

The present invention therefore also provides a process for producing the films according to the invention. It comprises
  producing a multilayer film from a base layer B and the outer layer(s) A (and C) by coextrusion and shaping the melts to give flat melt films,
  coating the film with the layer which crosslinks via acrylic compounds (preferably between the first and the second stretching step),
  biaxial stretching of the film, and
  heat-setting of the stretched film.

To produce the layers A and C (outer layers A and C), it is appropriate to feed polymer granules, preferably of polyethylene terephthalate, to two extruders. The materials are melted at about 300° C. and extruded or coextruded.

The polymers for the base layer are appropriately fed through a further extruder. Any foreign bodies or impurities present can be filtered out of the polymer melt. The melts are shaped in a multilayer nozzle to give flat melt films and layered on top of each other. Subsequently, the multilayer film is drawn off with the aid of a chill roll and optionally further rolls and solidified.

The biaxial stretching is generally carried out sequentially. Preference is given to stretching first in the longitudinal direction (i.e. in machine direction, MD) and then in transverse direction (i.e. at right angles to machine direction, TD). The stretching in the longitudinal direction can be carried out with the aid of two rolls running at different rates in accordance with the intended stretching ratio. For transverse stretching, an appropriate center frame is generally used.

The temperature at which the stretching is carried out can be varied within a relatively wide range and depends on the desired properties of the film. In general, the longitudinal stretching is carried out at from approx. 80 to 130° C. and the transverse stretching at from approx. 80 to 150° C. The longitudinal stretching ratio is preferably in the range from 3:1 to 6:1, in particular from 3.5:1 to 5.5:1. The transverse stretching ratio is generally in the range from 3.0:1 to 5.0:1, preferably from 3.5:1 to 4.5:1.

The film of the present invention is preferably oriented in such a way that the planar orientation $\Delta p$ of the film is greater than 0.163, preferably greater than 0.164 and more preferably greater than 0.165. Otherwise, the gloss of the surface layer A is in some circumstances inadequate for barrier coating by the CVD method.

In the subsequent heat-setting, the film is kept at a temperature of from approx. 150 to 250° C. for from about 0.1 to 10 s. Subsequently, the film is wound up in a customary manner.

One advantage of the invention is that the production costs of the inventive film are comparable with those of the prior art. The other properties of the inventive film which are relevant to processing and use remain substantially unchanged or are even improved. In addition, when producing the film, it is guaranteed that the regrinds can be reused in a concentration of from approx. 20 to 50% by weight, based on the total weight of the film, without the physical properties of the film being significantly adversely affected.

The film is outstandingly suitable, for example, for the packaging of foods or other consumable items which are sensitive to air and/or to light. It is especially suitable for producing packagings for coffee, tea or spices, in particular ground coffee.

In summary, the inventive film features an outstanding oxygen barrier after it has been coated on film surface A with materials which are used in CVD or in PECVD methods, a high gloss of the film surface A and a low opacity. In addition, the film which has been coated beforehand with the above-described acrylic polymers has very good handling, very good winding properties and very good processing performance. The film also becomes distinctly less electrostatically charged than comparable films which do not have the above-described layer which crosslinks via acrylic compounds. The layer which crosslinks via acrylic compounds is additionally especially suitable for printing, in particular with nitrocellulose(NC) dyes.

The film has an oxygen permeation of less than 3.0 $cm^3 \cdot m^{-2} \cdot d^{-1} \cdot bar^{-1}$, preferably less than 2.5 $cm^3 \cdot m^{-2} \cdot d^{-1} \cdot bar^{-1}$ and more preferably less than 2.0 $cm^3 \cdot m^{-2} \cdot d^{-1} \cdot bar^{-1}$ after it has been coated on the film surface A; preferably by the CVD or PECVD method.

Substances which can be applied to the surface of the outer layer by the CVD or PECVD method are, for example, hexamethyldisiloxane or $CH_4$, and their appropriate method is the AIRCO Coating Technology which was presented, for example, by R. J. Nelson at the Society for the Research of Polymerized Compound Surfaces, Fukui City, Japan, Jul. 9, 1993.

The gloss (20°) of the film surface A is preferably greater than 190. In a preferred embodiment, the gloss of this side is more than 200 and in a particularly preferred embodiment more than 210. This film surface is also suitable for printing or for metallization. The high gloss of the film is transferred to the print or the applied metal layer and thus confers on the film the desired appearance which is effective in advertising. The opacity of the film is preferably less than 2.5%.

The table which follows (table 1) once again summarizes the most important inventive film properties.

TABLE 1

| | Inventive range | Preferred | More preferred | Most preferred | Unit | Measurement method |
|---|---|---|---|---|---|---|
| Planar orientation Δp | >0.163 | >0.164 | >0.165 | | | |
| Constants of the equation (1) for the side C not to be coated | $A_{h1} = 0.05$<br>$B_{h1} = 3.3$ | $A_{h1} = 0.624$<br>$B_{h1} = 3.229$ | $A_{h1} = 1.1$<br>$B_{h1} = 3.0$ | $A_{h1} = 2.477$<br>$B_{h1} = 2.22$ | | |
| Oxygen permeation of the coated film | <3 | <2.5 | <2 | | $cm^3 \cdot m^{-2} \cdot d^{-1} \cdot bar^{-1}$ | DIN 53 380, part 3 |
| Gloss, side A (measuring angle 20°)[i] | >190 | >200 | >210 | | | DIN 67 530 |
| Opacity[i] | <2.5 | <2.0 | <1.7 | | % | ASTM-D 1003-52 |
| Coefficient of friction: C side against itself | <0.45 | <0.42 | <0.39 | | | DIN 53 375 |
| Coefficient of friction: A side against itself | <0.6 | <0.55 | <0.5 | | | DIN 53 375 |
| Average roughness $R_a$ C side | 30–150 | 40–123 | 50–110 | | nm | DIN 4768 at a cutoff of 0.25 nm |
| Average roughness $R_a$ A side | 28 | 25 | 21 | | nm | DIN 4768 at a cutoff of 0.25 nm |

[i]measured on the uncoated film

To characterize the raw materials (starting polymers) and the films, the following methods were used:
DIN=Deutsches Institut für Normung [German Institute for Standardization]
ASTM=American Society for Testing and Materials
ISO=International Organization for Standardization (1) Determination of the Planar Orientation Δp The planar orientation is determined via the measurement of the refractive index with an Abbe refractometer (A. Krüss, Optronic, Hamburg, Germany).

The sample preparation is as follows:
Sample size and sample length: 60 to 100 nm
Sample breadth: corresponds to prism breadth of 10 mm To determine $n_{MD}$ and $n_\alpha$ (=$n_z$), the sample to be analyzed has to be cut out of the film with the running edge of the sample coinciding exactly with TD. To determine $n_{TD}$ and $n_\alpha$ (=$n_z$), the sample to be analyzed has to be cut out of the film with the running edge of the sample coinciding exactly with MD. The samples are to be taken from the middle of the film web. Care has to be taken that the Abbe refractometer has a temperature of 23° C. With the aid of a glass rod, a little diiodomethane (n=1.745) or diiodomethanebromonaphthalene mixture is applied before the measurement to the thoroughly cleaned lower prism. The refractive index of the mixture has to be greater than 1.685. First the sample cut out in TD is applied thereto, in such a way that the entire prism surface is covered. A paper tissue is then used to fasten the film firmly onto the prism, so that the film lies firm and smooth. The excess liquid has to be sucked off. Afterwards, a little of the measuring liquid is dripped onto the film. The second prism is swung downwards and pressed on firmly. The right-hand knurled screw is then used to turn the indicator scale until a transition from light to dark can be seen in the viewing window in the range from 1.62 to 1.68. When the transition from light to dark is not sharp, the colors are brought together with the aid of the upper knurled screw in such a way that only a light and a dark zone are visible. The sharp transition line is brought with the aid of the lower knurled screw to the crossing point of the two diagonal lines (in the eyepiece). The value now indicated in the measuring scale is read off and entered into the test record. This is the refractive index in machine direction $n_{MD}$. The scale is now turned with the lower knurled screw until the range visible in the eyepiece is between 1.49 and 1.50.

The refractive index $n_\alpha$ or $n_z$ (in the thickness direction of the film) is now determined. So that the transition, which is only weakly visible, can be better seen, a polarization film is placed on the eyepiece. This has to be turned until the transition can be clearly seen. The same applies as for the determination of $n_{MD}$. When the transition from light to dark is not sharp (colored), the colors are brought together with the aid of the upper knurled screw in such a way that a sharp transition can be seen. This sharp transition line is brought with the aid of the lower knurled screw to the crossing point of the two diagonal lines and the value indicated on the scale is read off and entered into the table.

Subsequently, the sample is turned and the corresponding refractive indices $n_{MD}$ and $n_\alpha$ (=$n_z$) of the other surface side are measured and entered into a corresponding table.

After the determination of the refractive indices in MD and in the thickness direction, the sample strip cut out in MD is laid on and the refractive indices $n_{TD}$ (at right angles to machine direction) and $n_\alpha$ (=$n_z$) are determined correspondingly. The strip is turned round and the values are measured for the B side. The values for the A side and the B side are combined to average refractive values. The orientation values are then calculated from the refractive indices by the following formulae:

$$\Delta n = n_{MD} - n_{TD}$$

$$\Delta p = (n_{MD} + n_{TD})/2 - n_z$$

$$n_{av} = (n_{MD} + n_{TD} + n_z)/3$$

(2) Oxygen Permeation

The oxygen permeation of the coated films was measured using an OX-TRAN 2/20 from Mocon Modern Controls (USA) in accordance with DIN 53 380, part 3.

(3) SV (Standard Viscosity) Value and IV Value

The standard viscosity SV (DCA) is determined at 25° C. in dichloroacetic acid, based on DIN 53726. The intrinsic viscosity (IV) is calculated from the standard viscosity as follows:

$$IV = [\eta] = 6.907 \cdot 10^{-4} SV(DCA) + 0.063096 \text{ [dl/g]}$$

(4) Friction

The friction was determined to DIN 53375. The friction was determined 14 days after the production. Blocking takes place when the frictional value is greater than 1 or when discontinuities occur when frictional force is measured in the variation of frictional force with displacement.

(5) Opacity

The opacity of the film was determined to ASTM-D 1003-52. The opacity measurement according to Hölz was determined based on ASTM-D 1003-52, except that, to utilize the optimum measuring range, measurement was effected on four film plies lying on top of one another and, instead of a 4° pinhole diaphragm, a 1° slot diaphragm is used.

(6) Gloss

The gloss was determined to DIN 67530. The reflector value was measured as a characteristic optical parameter for the surface of a film. Based on the standards ASTM-D 523-78 and ISO 2813, the angle of incidence was set to 20° or 60°. A light beam hits the flat test surface at the angle of incidence set and is reflected or scattered by it. The light beams incident upon the photoelectronic detector are displayed as a proportional electrical parameter. The measurement is dimensionless and has to be quoted together with the angle of incidence.

(7) Determination of the Particle Sizes on Film Surfaces

The size distribution of elevations on film surfaces is determined using a scanning electron microscope and an image analysis system. The system used is the Philips XL30 CP scanning electron microscope with an integrated image analysis program AnalySIS from Soft-imaging System.

For these measurements, film samples were applied flat to a sample holder. These are subsequently provided with a thin metal layer (for example of silver) by vapor deposition obliquely at an angle α. α is the angle between sample surface and the diffusion direction of the metal vapor. This oblique vapor deposition results in a shadow behind the elevation. Since the shadows are not yet electrically conductive, the sample is subsequently subjected to vapor deposition or sputtering with a second metal (e.g. gold), which results in the second coating hitting the sample surface vertically and therefore no shadows being present in the second coating.

The sample surfaces prepared in this way are imaged in a scanning electron microscope (SEM). As a consequence of the material contrast of the metals, the shadows of the elevations are visible. The sample is oriented in the SEM in such a way that the shadows run parallel to one edge of the image. For the image recording, the following SEM conditions are set: secondary electron detector, operating distance: 10 mm, acceleration voltage: 10 kV and spot: 4.5. The brightness and contrast are adjusted in such a way that all image information is represented as gray values and the intensity of the background noise is so small that it is not detected as shadow. The length of the shadows is evaluated using the image analyzer. The threshold value for the shadow recognition is placed at the point where the second derivative of the gray value distribution of the image passes through the zero point. Before the shadow recognition, the image is smoothed using an N×N filter (size 3, 1 iteration). The setting of a frame ensures that elevations that are not depicted fully in the image are not included in the measurement. The magnification, the frame size and the number of images evaluated are selected in such a way that a total of 0.36 mm² of film surface is evaluated.

The height of the individual elevations is calculated from the individual shadow lengths by the following relationship:

$$h = \tan(\alpha) \cdot L$$

where h is the height of the elevation, α is the vapor deposition angle and L is the shadow length. The elevations determined in this way are divided into classes, in order to arrive at a frequency distribution. The division is into classes of breadth 0.05 μm between 0 and 1 μm, and the smallest class (0 to 0.05 μm) is not used for further evaluations. The diameters (diffusion at right angles to the direction in which the shadow is thrown) of the elevations are classified in a similar manner into classes of breadth 0.2 μm from 0 to 10 μm, and in this case also the smallest class is not used for further evaluation.

(8) Roughness

The roughness $R_a$ of the film was determined to DIN 4768 at a cutoff of 0.25 mm.

(9) Measurement of the Average Particle Size $d_{50}$

The determination of the average particle size $d_{50}$ was carried out by means of laser on a Malvern MasterSizer (Malvern Instruments GmbH, Herrenberg, Germany) by the standard method (other measuring instruments are, for example, Horiba LA 500 or Sympathec Helos, which use the same measuring principle). To this end, the samples were introduced into a cuvette with water and this was then placed in the measuring instrument. The measuring procedure is automatic and includes a mathematical determination of the $d_{50}$ value.

The $d_{50}$ value is determined by definition from the (relative) cumulative particle size distribution curve: the point at which the 50% ordinate value cuts the cumulative curve immediately provides the desired $d_{50}$ value on the abscissa axis.

(10) Measurement of the SPAN 98

The determination of the SPAN 98 was carried out with the same measuring instrument as above for the determination of the average diameter $d_{50}$. The SPAN 98 is defined as follows:

$$SPAN98 = \frac{d_{98} - d_{10}}{d_{50}}.$$

For the determination of $d_{98}$ and $d_{10}$, the basis is again the (relative) particle size distribution curve. The point at which the 98% ordinate value cuts the cumulative curve immediately provides the desired $d_{98}$ value on the abscissa axis and the point at which the 10% ordinate value cuts the cumulative curve immediately provides the desired $d_{10}$ value on the abscissa axis.

EXAMPLE 1

Chips of polyethylene terephthalate (prepared by the transesterification process using Mn as the transesterification catalyst, Mn concentration: 100 ppm) were dried at 160° C. to a residual moisture of below 50 ppm and fed to the extruder for the base layer B.

In addition, chips of polyethylene terephthalate (prepared via the transesterification process using Mn as the transesterification catalyst, Mn concentration: 100 ppm) were likewise dried at 160° C. to a residual moisture of below 50 ppm and fed to the particular extruders for the outer layers A and C. The granules for the outer layer A contain no external pigments; the granules for the outer layer C contain the pigments required for the processing of the film.

Coextrusion and subsequent stepwise orientation in the longitudinal and transverse direction provided a transparent three-layer film having ABC structure and a total thickness of 12 μm. The thickness of the particular layers can be taken from table 2.

The inventive coating D consists of a 4.5% by weight solution of a latex consisting of a copolymer of 60% by weight of methyl methacrylate, 35% by weight of ethyl acrylate and 5% by weight of N-methylolacrylamide. The outer layer C of the film was coated in accordance with the present invention between the longitudinal and transverse orientation of the film, using the reverse gravure-roll coating method. The layer thickness of the coating D on the final film was approx. 50 nm.

Outer layer A, mixture of:
100.0% by weight of polyethylene terephthalate having an IV value of 0.616

Base layer B:
100.0% by weight of polyethylene terephthalate having an IV value of 0.616

Outer layer C, mixture of:
88.0% by weight of polyethylene terephthalate having an IV value of 0.616
12.0% by weight of a masterbatch composed of 98.0% by weight of polyethylene terephthalate and 1.0% by weight of Sylobloc® 44 H (Grace) and 1.0% by weight of Aerosil® TT 600 (Degussa); these are both $SiO_2$.

The production conditions in the individual process steps were:

| | | | |
|---|---|---|---|
| Extrusion: | Temperatures | A layer: | 300° C. |
| | | B layer: | 300° C. |
| | | C layer: | 300° C. |
| | Die gap width: | | 1 mm |
| | Temperature of the takeoff roll: | | 30° C. |
| Longitudinal stretching: | Temperature: (heating 80–115° C., stretching at 115° C.) | | 80–115° C. |
| | Longitudinal stretching ratio: | | 4.5 |
| Transverse stretching: | Temperature: | | 80–155° C. |
| | Transverse stretching ratio: | | 4.0 |
| Setting: | Temperature: | | 230° C. |
| Time: | | | 3 s |

After producing the film (of this example 1 and the following examples), it was coated on the A side in an industrial PE-CVD coater with $SiO_x$ by means of the plasma polymerization of hexamethyldisiloxane under reduced pressure. The coating rate was 5 m/s.

The film had the required high oxygen barrier (=low oxygen permeation). The film structure and the properties achieved of the films produced can be taken from tables 2 and 3.

EXAMPLE 2

In a similar manner to example 1, coextrusion and subsequent stepwise orientation in the longitudinal and transverse direction were used to produce a transparent, three-layer film having ABC structure and a total thickness of 12 μm. In comparison to example 1, only outer layer C was changed.

Outer layer C, mixture of:
80.0% by weight of polyethylene terephthalate having an SV value of 800
20.0% by weight of a masterbatch of 98.0% by weight of polyethylene terephthalate (SV value of 800) and 1.0% by weight of Sylobloc® 44 H (Grace) and 1.0% by weight of Aerosil® TT 600 (Degussa)

The process conditions for the film for all layers were as selected in example 1.

COMPARATIVE EXAMPLE 1 (CE 1)

Example 1 of EP-A-0 514 129 was reproduced. The film which had been coated as in example 1 and was 75 μm thick did not have the required oxygen permeation. The gloss of the film is not satisfactory.

COMPARATIVE EXAMPLE 2 (CE 2)

Example 1 of EP-A-0 604 057 was reproduced. The film which had been coated as in example 1 and was 60 μm thick did not have the required oxygen permeation. The gloss of the film is not satisfactory.

TABLE 2

| | Film thickness | Film structure | Layer thickness A/B/C | Pigments in the layers | | | Average pigment diameter | | | Pigments concentration | | |
|---|---|---|---|---|---|---|---|---|---|---|---|---|
| Example | μm | | μm | A | B | C | A | B | C | A | B | C |
| | | | | | | | μm | | | ppm | | |
| Example 1 | 12 | ABC | 1.0/9.5/1.5 | none | none | Sylobloc 44H Aerosil TT 600 | | | 2.5 0.04 | 0 | 0 | 1e+07 |
| Example 2 | 12 | ABC | 1.0/9.5/1.5 | none | none | Sylobloc 44H Aerosil TT 600 | | | 2.5 0.04 | 0 | 0 | 2e+07 |
| CE1 | 75 | ABA | 4/67/4 | Glass beads + Aerosil Ox50 | none | Glass beads + Aerosil Ox50 | 2.7 0.04 | | 2.7 0.04 | 3001 200 | 0 | 3e+06 |
| CE2 | 60 | ABA | 1.5/57/1.5 | Tosperl 130 | none | Tosperl 130 | 3 | | 3 | 600 | 0 | 600 |

TABLE 3

| Examples | Constants for the height distribution of the particles | | Oxygen permeation $cm^3/(m^2 \cdot bar \cdot d)$ | Friction C/C | Planar orientation Δp | Roughness $R_a$ C side nm | Roughness $R_a(i)$ A side nm | Gloss[i] (20°) A side | Opacity[i] % | Processing performance |
|---|---|---|---|---|---|---|---|---|---|---|
| | $A_h$ C side | $B_h$ | | | | | | | | |
| Example 1 | $A_{h1}$ = 0.65 | $B_{h1}$ = 3.0 | 0.5* | 0.35* | 0.166 | 60 | 20 | 200 | 1.7 | very good |
| Example 2 | $A_{h1}$ = 1.2 | $B_{h1}$ = 2.9 | 0.5* | 0.32* | 0.167 | 65* | 20 | 200 | 1.9* | very good |

TABLE 3-continued

| Examples | Constants for the height distribution of the particles A$_h$ C side | B$_h$ | Oxygen permeation cm$^3$/(m$^2$ · bar · d) | Friction C/C | Planar orientation Δp | Roughness R$_a$ C side nm | Roughness R$_a$(i) A side nm | Gloss[i] (20°) A side | Opacity[i] % | Processing performance |
|---|---|---|---|---|---|---|---|---|---|---|
| CE1 | | | 3.5 | 0.46 | | 35 | | 160 | 1.3 | |
| CE2 | | | 4 | 0.26 | | 55 | | 165 | 0.6 | |

[i]measured on the uncoated film
A side: coated outer layer with SiO$_x$, layer thickness: 30 nm
C side: outer layer with acrylate-containing coating
*correction: repeat measurement 07.07.03

What is claimed is:

1. A biaxially oriented polyester film which has a base layer B composed of at least 80% by weight of a thermoplastic polyester, and has two outer layers A and C, wherein
   a) the outer layer A has high surface smoothness and comprises substantially no external particles,
   b) the outer layer C comprises external particles and has, per mm$^2$ of film surface area, a number of elevations N$_c$ which correlate by way of the following equation to their respective heights h $$A_{h1} - B_{h1} \cdot \log_{10} h/\mu m \leq \log_{10}(N_c/mm^2) \quad (1)$$

$$0.01\ \mu m \leq h \leq 1\ \mu m$$

$$A_{h1} = 0.05;\ B_{h1} = 3.3$$

and
   c) the outer layer C has an acrylate-containing layer D.

2. The polyester film as claimed in claim 1, wherein the polyester of the base layer B contains units of ethylene glycol and terephthalic acid, and/or units of ethylene glycol and naphthalene-2,6-dicarboxylic acid.

3. The polyester film as claimed in claim 1, wherein the polyester used in the base layer B comprises polyethylene terephthalate.

4. The polyester film as claimed in claim 1, wherein no external particles are present in the outer layer A.

5. The polyester film as claimed in claim 1, wherein the outer layer C comprises, as external particles, antiblocking agents or pigments.

6. The polyester film as claimed in claim 1, wherein the antiblocking agents present in the outer layer C comprise SiO$_2$.

7. The polyester film as claimed in claim 1, wherein the external particles of the outer layer C have an average primary particle diameter smaller than 60 nm and/or an average primary particle diameter of from 1 to 4 μm.

8. The polyester film as claimed in claim 1, wherein the concentration of the external particles in the outer layer C is from 0.1 to 0.5% by weight, based on the weight of the layer C.

9. The polyester film as claimed in claim 1, wherein the acrylate-containing layer D comprises one or more polymerized acrylic and/or methacrylic monomers and copolymerizable comonomers capable of developing intermolecular crosslinking.

10. The polyester film as claimed in claim 1, wherein the acrylate-containing layer D is applied in the form of an aqueous dispersion to the outer layer C.

11. The polyester film as claimed in claim 1, which has a planar orientation greater than 0.163.

12. The polyester film as claimed in claim 1, wherein the uncoated surface layer A has a gloss (20°) greater than 190 and a roughness Ra ≦ 28 nm.

13. The polyester film as claimed in claim 1, which has an A-B-C-D layer structure.

14. The polyester film as claimed in claim 1, further comprising a film coated on the layer A by a CVD or PECVD process, wherein the oxygen permeation provided by the film coated on the outer layer A by the CVD or PECVD process is smaller than 3 cm$^3$/(m$^2$·bar·d).

15. The polyester film as claimed in claim 1, wherein the outer layer A of the film has been coated, using plasma-polymerized hexamethyldisiloxane or CH$_4$.

16. A process for producing a polyester film as claimed in claim 1, comprising the steps of
   a) producing a multilayer film by extrusion or coextrusion, and shaping the melts to give flat melt films,
   b) coating the film with an acrylate-containing layer,
   c) biaxial stretching of the film, and
   d) heat-setting of the stretched film.

17. Packaging film formed from polyester film in accordance with claim 1.

18. A polyester film according to claim 1, wherein the outer layer A has a roughness, R$_a$, of less than or equal to 28 nm.

* * * * *